(12) United States Patent
Dogan et al.

(10) Patent No.: US 7,923,113 B2
(45) Date of Patent: Apr. 12, 2011

(54) MULTILAYER COATING SYSTEM

(75) Inventors: Nazire Dogan, Leiden (NL); Josef Pancratius Maria Jonker, Sassenheim (NL); Robertus Petrus Cornelis Van Der Krogt, Sassenheim (NL); Peter Wijnands, Sassenheim (NL)

(73) Assignee: Akzo Nobel Coating International B.V., Arnhem (NL)

( * ) Notice: Subject to any disclaimer, the term of this patent is extended or adjusted under 35 U.S.C. 154(b) by 191 days.

(21) Appl. No.: 12/097,431

(22) PCT Filed: Dec. 12, 2006

(86) PCT No.: PCT/EP2006/069572
§ 371 (c)(1),
(2), (4) Date: Sep. 30, 2008

(87) PCT Pub. No.: WO2007/068683
PCT Pub. Date: Jun. 21, 2007

(65) Prior Publication Data
US 2009/0142600 A1 Jun. 4, 2009

Related U.S. Application Data

(60) Provisional application No. 60/760,930, filed on Jan. 23, 2006.

(30) Foreign Application Priority Data

Dec. 15, 2005 (EP) .................................. 05112256

(51) Int. Cl.
*B32B 27/40* (2006.01)
*C08G 18/38* (2006.01)
*B05D 7/08* (2006.01)

(52) U.S. Cl. ............... 428/423.1; 428/422.8; 428/425.9; 427/333; 427/340; 427/517

(58) Field of Classification Search ............... 428/422.8, 428/423.1, 425.9; 427/333, 340, 517
See application file for complete search history.

(56) References Cited

U.S. PATENT DOCUMENTS

| | | | |
|---|---|---|---|
| 3,479,310 A | 11/1969 | Dieterich et al. | |
| 3,640,967 A | 2/1972 | Konig et al. | |
| 3,905,929 A | 9/1975 | Noll | |
| 3,920,598 A | 11/1975 | Reiff et al. | |
| 4,190,566 A | 2/1980 | Noll et al. | |
| 4,237,264 A | 12/1980 | Noll et al. | |
| 4,269,748 A | 5/1981 | Nachtkamp et al. | |
| 4,753,825 A | 6/1988 | Linden et al. | |
| 4,764,553 A | 8/1988 | Mosbach et al. | |
| 4,808,691 A | 2/1989 | Konig et al. | |
| 4,829,122 A | 5/1989 | Pedain et al. | |
| 5,141,987 A | 8/1992 | Nachtkamp et al. | |
| 5,214,086 A | 5/1993 | Mormile et al. | |
| 5,334,420 A | 8/1994 | Hartung et al. | |
| 5,342,882 A | 8/1994 | Gobel et al. | |
| 5,578,345 A | 11/1996 | Moy | |
| 5,578,346 A | 11/1996 | Moy | |
| 5,840,823 A | 11/1998 | Licht et al. | |
| 7,045,579 B2 * | 5/2006 | Van Den Berg et al. | 525/350 |
| 2003/0207104 A1 * | 11/2003 | Van Den Berg et al. | 428/343 |
| 2004/0091716 A1 * | 5/2004 | Van Den Berg et al. | 428/422.8 |
| 2007/0202341 A1 * | 8/2007 | Dogan et al. | 428/423.1 |

FOREIGN PATENT DOCUMENTS

| | | |
|---|---|---|
| CA | 2114035 | 7/1994 |
| CA | 2174663 | 6/1995 |
| DE | 1 570 540 | 3/1970 |
| DE | 1 770 245 | 10/1971 |
| DE | 26 42 071 | 3/1977 |
| DE | 37 17 060 | 12/1988 |
| DE | 39 36 794 | 5/1991 |
| DE | 43 01 991 | 7/1994 |
| EP | 0 269 972 | 6/1988 |
| EP | 0 448 224 | 9/1991 |
| EP | 0 471 972 | 2/1992 |
| EP | 0 794 204 | 9/1997 |
| EP | 0 898 202 | 2/1999 |
| GB | 2 307 473 | 5/1997 |
| WO | WO 93/17060 | 9/1993 |
| WO | WO 95/14745 | 6/1995 |
| WO | WO 97/31073 | 8/1997 |
| WO | WO 01/68736 | 9/2001 |
| WO | WO 01/92362 | 12/2001 |
| WO | WO 01/92363 | 12/2001 |
| WO | WO 02/44234 | 6/2002 |

OTHER PUBLICATIONS

International Search Report, PCT International Patent Application No. PCT/EP2006/069572, dated Mar. 26, 2007.
European Search Report, European Application No. EP 05 11 2256, dated Apr. 24, 2006.
Abstract Only of Iwakura et al., *Can. J. Chem*, (1960) 38, pp. 2418-2424.
Notice of Opposition, European Application No. EP 1963392, dated Apr. 20, 2010 (English-language translation provided).

* cited by examiner

*Primary Examiner* — Thao T. Tran
(74) *Attorney, Agent, or Firm* — Kenyon & Kenyon LLP

(57) ABSTRACT

The invention relates to a multi-layer coating system comprising at least one layer a) comprising a coating composition a) comprising at—least one isocyanate-functional compound and at least one thiol-functional compound, and—at least one layer b) comprising an aqueous coating composition b), wherein at least one layer a) and at least one layer b) have at least one common layer boundary, and wherein coating composition b) comprises at least 17 mmol/kg, calculated on the weight of coating composition b), of a catalyst for the addition reaction of the at least one thiol-functional compound and the at least one isocyanate-functional compound.

16 Claims, No Drawings

MULTILAYER COATING SYSTEM

REFERENCE TO RELATED APPLICATION(s)

This application is the U.S. National Phase of PCT/EP2006/069572 filed on Dec. 12, 2006 and claims the benefit of U.S. Provisional Application No. 60/760,930 filed on Jan. 23, 2006.

The invention relates to a multilayer coating system comprising at least one layer a) comprising a coating composition a) comprising at least one isocyanate-functional compound and at least one thiol-functional compound, and at least one layer b) comprising an aqueous coating composition b), wherein at least one layer a) and at least one layer b) have at least one common layer boundary. The invention also relates to a process of preparing the multilayer coating system, and to a kit of parts for preparation of a base coat composition.

U.S. Pat. No. 5,578,346 describes multilayer composite coatings which comprise (a) a first coat which is substantially free of isocyanate functionality and which comprises a film-forming composition capable of curing or drying and a catalyst for the reaction of isocyanate groups and active hydrogen groups, and (b) a second coat which is applied to the surface of the first coat and which comprises an active hydrogen compound and a polyisocyanate. Examples wherein the first coat comprises dibutyl tin dilaurate and the second coat is based on a polyol and a polyisocyanate are described.

International patent application WO 0192362 describes a photoactivatable coating composition comprising a photolatent base and a base-catalyzed polymerizable or curable organic material comprising at least one polyisocyanate and at least one compound containing at least one thiol group. The photoactivatable coating composition can be a clear coat composition which is to be applied on top of a base coat composition. The photoactivatable coating composition has a long pot life and exhibits fast curing upon irradiation with ultraviolet and visible light. The known photoactivatable coating composition eventually also cures in shadow areas, i.e. those areas of a coated substrate which are not exposed to ultraviolet or visible light.

A drawback of the known multilayer coating systems is that the curing speed of the top coats of the known systems is not always as fast as desirable. Fast curing of the photoactivatable coating composition according to WO 0192362 is only achieved upon irradiation with visible and/or ultraviolet light, while the curing speed in shadow areas is rather slow and subject to further improvement.

The current invention seeks to alleviate the above-mentioned drawback of the known multilayer coating systems. More in particular, the coating composition comprising at least one isocyanate-functional compound and at least one thiol-functional compound should be rapidly curable also in shadow areas or even without any irradiation with visible and/or ultraviolet light. Rapid curability should not be achieved at the expense of the pot life of the composition. Furthermore, if the coating composition comprising at least one isocyanate-functional compound and at least one thiol-functional compound is a clear coat composition, it is desirable that application of the clear coat should lead to only minimal or even no strike-in effect in an underlying base coat layer.

It has now been found that these objectives can be achieved with a multilayer coating system comprising
at least one layer a) comprising a coating composition a) comprising at least one isocyanate-functional compound and at least one thiol-functional compound, and
at least one layer b) comprising an aqueous coating composition b), wherein at least one layer a) and at least one layer b) have at least one common layer boundary, and wherein coating composition b) comprises at least 17 mmol/kg, calculated on the weight of coating composition b), of a catalyst for the addition reaction of the at least one thiol-functional compound and the at least one isocyanate-functional compound.

In the multilayer coating system according to the invention coating composition a) comprising at least one isocyanate-functional compound and at least one thiol-functional compound cures rapidly also in shadow areas or even without any irradiation with visible and/or ultraviolet light. Since no additional components, such as a catalyst, need to be added to coating composition a), the pot life of coating composition a) is not decreased. Thus, rapid curability is not achieved at the expense of the pot life of the composition.

Furthermore, application of a clear coat composition of coating composition a) leads to minimal or even no strike-in effect in an underlying base coat layer produced from an aqueous base coat composition b).

The invention also relates to a method of increasing the cure speed in a multi-layer coating system. The method comprises applying a clear coat composition a) comprising at least one isocyanate-functional compound and at least one thiol-functional compound on top of a base coat layer b) prepared from an aqueous base coat composition b) comprising at least 17 mmol/kg, calculated on the weight of coating composition b), of a catalyst for the addition reaction of the at least one thiol-functional compound and the at least one isocyanate-functional compound.

Suitable isocyanate-functional compounds for use in coating composition a) are isocyanate-functional compounds comprising at least one isocyanate group. Alternatively, the isocyanate-functional compound in coating composition a) is a polyisocyanate, such as an aliphatic, cycloaliphatic or aromatic di-, tri- or tetra-isocyanate. Examples of diisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, dodecamethylene diisocyanate, (ω,ω'-dipropylether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexene, trans-vinylidene diisocyanate, dicyclohexyl methane-4,4'-diisocyanate (Desmodur® W), toluene diisocyanate, 1,3-bis(isocyanatomethyl) benzene, xylylene diisocyanate, α,α,α',α'-tetramethyl xylylene diisocyanate (TMXDI®), 1,5-dimethyl-2,4-bis(2-isocyanatoethyl) benzene, 1,3,5-triethyl-2,4-bis(isocyanatomethyl) benzene, 4,4'-diisocyanato-diphenyl, 3,3'-dichloro-4,4'-diisocyanato-diphenyl, 3,3'-diphenyl-4,4'-diisocyanato-diphenyl, 3,3'-dimethoxy-4,4'-diisocyanato-diphenyl, 4,4'-diisocyanato-diphenyl methane, 3,3'-dimethyl-4,4'-diisocyanato-diphenyl-methane, and diisocyanatonaphthalene. Examples of triisocyanates include 1,3,5-triisocyanatobenzene, 2,4,6-triisocyanatotoluene, 1,8-diisocyanato-4-(isocyanatomethyl) octane, and lysine triisocyanate. Adducts and oligomers of polyisocyanates, for instance biurets, isocyanurates, allophanates, uretdiones, urethanes, and mixtures thereof are also included. Examples of such oligomers and adducts are the adduct of 2 molecules of a diisocyanate, for example hexamethylene diisocyanate or isophorone diisocyanate, to a diol such as ethylene glycol, the adduct of 3 molecules of hexamethylene diisocyanate to 1 molecule of water (available under the trademark Desmodur N of Bayer), the adduct of 1 molecule of trimethylol propane to 3 molecules of toluene diisocyanate (available under the trademark Desmodur L of Bayer), the adduct of 1 molecule of trimethylol propane to 3 molecules of isophorone diisocyanate, the adduct of 1 molecule of pentaerythritol to 4 molecules of toluene diisocyanate, the adduct of 3 moles of m-α,α,α',α'-tetramethyl xylene diisocyanate to 1 mole of trimethylol propane, the isocyanurate trimer of 1,6-diisocyanatohexane, the isocyanurate trimer of isophorone diisocyanate, the uretdion dimer of 1,6-diisocyanatohexane, the biuret of 1,6-diisocyanatohexane, the allophanate of 1,6-diisocyanatohexane, and mixtures thereof. Furthermore, (co)polymers of isocyanate-functional monomers such as α,α'-dimethyl-m-isopropenyl benzyl isocyanate are suitable for use.

The polyisocyanate can comprise hydrophilic groups, for example covalently bonded hydrophilic polyether moieties, which facilitate the formation of aqueous dispersions.

Thiol-functional compounds that can suitably be used in coating composition a) include dodecyl mercaptan, mercapto ethanol, 1,3-propanedithiol, 1,6-hexanedithiol, methylthioglycolate, 2-mercaptoacetic acid, mercaptosuccinic acid, and cysteine.

Also suitable are esters of a thiol-functional carboxylic acid with a polyol, such as esters of 2-mercaptoacetic acid, 3-mercaptopropionic acid, 2-mercapto-propionic acid, 11-mercaptoundecanoic acid, and mercaptosuccinic acid. Examples of such esters include pentaerythritol tetrakis(3-mercaptopropionate), pentaerythritol tetrakis(2-mercaptoacetate), trimethylol propane tris(3-mercaptopropionate), trimethylol propane tris(2-mercaptopropionate), and trimethylol propane tris(2-mercaptoacetate). A further example of such a compound consists of a hyperbranched polyol core based on a starter polyol, e.g. trimethylol propane and dimethylol propionic acid, which is subsequently esterified with 3-mercaptopropionic acid and isononanoic acid. These compounds are described in European patent application EP 0448224 A and International patent application WO 9317060.

Addition products of $H_2S$ to epoxy-functional compounds also give thiol-functional compounds. These compounds may have a structure of the following formula $T[(O-CHR-CH_2-O)_nCH_2CHXHCH_2YH]_m$, with T being a m valent organic moiety wherein m is an integer between 1 and 25, R being hydrogen or methyl, n being an integer between 0 and 30, X and Y being oxygen or sulfur, with the proviso that X and Y are not equal. An example of such a compound is commercially available from Cognis under the trademark Capcure® 3/800. Other syntheses to prepare compounds comprising thiol-functional groups involve: the reaction of an aryl or alkyl halide with NaHS to introduce a pendant mercapto group into the alkyl and aryl compounds, respectively; the reaction of a Grignard reagent with sulfur to introduce a pendant mercapto group into the structure; the reaction of a polymercaptan with a polyolefin according to a nucleophilic reaction, an electrophilic reaction or a radical reaction; the reaction of disulfides.

Good results have so far been obtained with pentaerythritol tetrakis(3-mercapto propionate), trimethylolpropane tris(3-mercaptopropionate), and Capcure 3/800 as thiol-functional compounds.

In another embodiment of the invention the thiol group of the thiol-functional compound in coating composition a) can be covalently attached to a resin. Such resins include thiol-functional polyurethane resins, thiol-functional polyester resins, thiol-functional polyaddition polymer resins, thiol-functional polyether resins, thiol-functional polyamide resins, thiol-functional polyurea resins, and mixtures thereof. Thiol-functional resins can be prepared by the reaction of $H_2S$ with an epoxy group or an unsaturated carbon-carbon bond-containing resin, the reaction between a hydroxyl-functional resin and a thiol-functional acid, and by the reaction of an isocyanate-functional polymer and either a thiol-functional alcohol or a di- or polymercapto compound.

A thiol-functional polyurethane resin can be the reaction product of a mono-, di-, tri- or tetrafunctional thiol compound with an isocyanate-terminated polyurethane and preferably is the reaction product of a diisocyanate compound and (a) diol-functional compound(s). Suitable thiol-functional polyurethane resins are obtainable by first preparing an isocyanate-functional polyurethane from diols, diisocyanates, and optionally building blocks containing groups which facilitate the stabilization of the resin in an aqueous dispersion, followed by reaction of the isocyanate-functional polyurethane with a polyfunctional thiol in a base-catalyzed addition reaction. Other thiol-functional polyurethane resins are known and described, e.g., in German patent publication DE 2642071 A and European patent application EP 0794204 A.

The thiol-functional resin can be a polyester prepared from (a) at least one polycarboxylic acid or reactive derivatives thereof, (b) at least one polyol, and (c) at least one thiol-functional carboxylic acid. The polyesters preferably possess a branched structure. Branched polyesters are conventionally obtained through condensation of polycarboxylic acids or reactive derivatives thereof, such as the corresponding anhydrides or lower alkyl esters, with polyalcohols, when at least one of the reactants has a functionality of at least 3.

Examples of suitable polycarboxylic acids or reactive derivatives thereof are tetrahydrophthalic acid, tetrahydrophthalic anhydride, hexahydrophthalic acid, hexahydrophthalic anhydride, methyl hexahydrophthalic acid, methyl hexahydrophthalic anhydride, dimethylcyclohexane dicarboxylate, 1,4-cyclohexane dicarboxylic acid, 1,3-cyclohexane dicarboxylic acid, phthalic acid, phthalic anhydride, isophthalic acid, terephthalic acid, 5-tert. butyl isophthalic acid, trimellitic anhydride, maleic acid, maleic anhydride, fumaric acid, succinic acid, succinic anhydride, dodecenyl succinic anhydride, dimethyl succinate, glutaric acid, adipic acid, dimethyl adipate, azelaic acid, and mixtures thereof.

Examples of suitable polyols include trimethylol propane, trimethylol ethane, glycerol, 1,2,6-hexanetriol, ethylene glycol, 1,2-propylene glycol, 1,3-propylene glycol, 2-methylpropane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentane diol, 3-methyl-pentane diol, 1,6-hexane diol, 2,2,4-trimethyl pentane-1,3-diol, dimethylol propionic acid, pentaerythritol, di-trimethylol propane, dipentaerythritol, and mixtures thereof.

Examples of suitable thiol-functional organic acids include 3-mercaptopropionic acid, 2-mercaptopropionic acid, thiosalicylic acid, mercaptosuccinic acid, mercaptoacetic acid, cysteine, and mixtures thereof.

Optionally, monocarboxylic acids and monoalcohols may be used in the preparation of the polyesters. Preferably, $C_4$-$C_{18}$ monocarboxylic acids and $C_6$-$C_{18}$ monoalcohols are used. Examples of the $C_4$-$C_{18}$ monocarboxylic acids include pivalic acid, hexanoic acid, heptanoic acid, octanoic acid, nonanoic acid, 2-ethylhexanoic acid, isononanoic acid, decanoic acid, lauric acid, myristic acid, palmitic acid, isostearic acid, stearic acid, hydroxystearic acid, benzoic acid, 4-tert. butyl benzoic acid, and mixtures thereof. Examples of the $C_6$-$C_{18}$ monoalcohols include cyclohexanol, 2-ethylhexanol, stearyl alcohol, and 4-tert. butyl cyclohexanol.

In addition to thiol groups, the thiol-functional polyester prepared from the above components may also comprise hydroxyl groups. If hydroxyl groups are present, the ratio of thiol groups to hydroxyl groups suitably is in the range of 90:10 to 10:90, preferably 75:25 to 25:75.

The thiol-functional resin can be a thiol-functional polyaddition polymer, for example a poly(meth)acrylate. Such a poly(meth)acrylate is derived from hydroxyl-functional (meth)acrylic monomers, such as hydroxyethyl (meth)acrylate, hydroxypropyl(meth)acrylate, hydroxybutyl(meth)acrylate, and other ethylenically unsaturated polymerizable monomers as described above for the polyaddition polymer preparation. The thiol group is introduced by esterification of (part of) the hydroxyl groups of the acrylate copolymer with one or more of the thiol-functional carboxylic acids described above.

Alternatively, glycidyl methacrylate is introduced into the polymer to prepare an epoxy-functional poly(meth)acrylate. The epoxy groups are then reacted with suitable thiol-functional carboxylic acids such as mentioned above. Alternatively, the thiol group can be introduced by reacting an isocyanate-functional polyacrylate with a thiol-functional alcohol, e.g., mercapto ethanol. The polyaddition polymer is prepared by conventional methods as described above, for instance by the slow addition of appropriate monomers to a solution of an appropriate polymerization initiator, such as an azo or peroxy initiator.

Coating composition a) in the multilayer system according to the present invention may be a water borne composition, a solvent borne composition or a solvent-free composition. Since the composition may be composed of liquid oligomers, it is especially suitable for use as a high-solids composition or a solvent-free composition. Suitably, the theoretical volatile organic content (VOC) in coating composition a) is less than 450 g/l, or less than 350 g/l, or even less than 250 g/l. Alternatively, coating composition a) may be an aqueous powder coating dispersion wherein the thiol-functional compound is a resin having a Tg above 20° C. The coating composition may also be a powder coating composition or a hot melt coating composition.

In one embodiment coating composition a) comprises a combination of pentaerythritol tetrakis(3-mercapto propionate) and a thiol-functional polyester. It is preferred that the thiol-functional polyester additionally comprises hydroxyl groups.

As mentioned above, in the multilayer system according to the invention coating composition a) cures rapidly even without any irradiation with visible and/or ultraviolet light. Nevertheless, it may be desirable to further increase the curing speed by irradiation with visible and/or ultraviolet light. Accordingly, in one embodiment of the invention coating composition a) comprises a photolatent base. Suitable photolatent bases include N-substituted 4-(o-nitrophenyl) dihydropyridines, optionally substituted with alkyl ether and/or alkyl ester groups, and quaternary organo-boron photoinitiators. Examples of N-substituted 4-(o-nitrophenyl) dihydropyridines are N-methyl nifedipine, N-butyl nifedipine, N-butyl 2,6-dimethyl 4-(2-nitrophenyl) 1,4-dihydropyridine 3,5-dicarboxylic acid diethyl ester, and a nifedipine according to the following formula

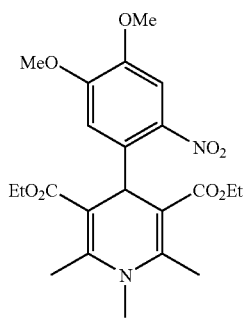

i.e., N-methyl 2,6-dimethyl 4-(4,5-dimethoxy-2-nitrophenyl) 1,4-dihydropyridine 3,5-dicarboxylic acid diethyl ester. Examples of quaternary organo-boron photoinitiators are disclosed in GB 2307473 A, such as

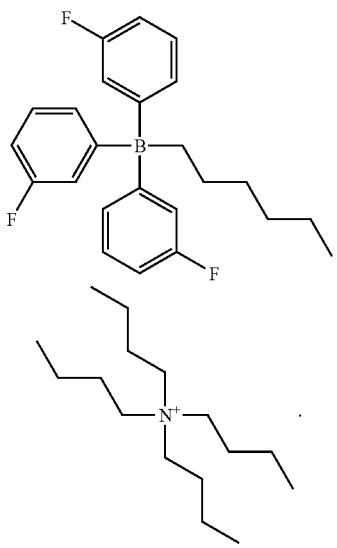

Thus far optimum results have been obtained with a photolatent base belonging to the group of α-amino acetophenones. Examples of α-amino acetophenones which can be used in the photoactivatable coating compositions according to the present invention are: 4-(methylthiobenzoyl)-1-methyl-1-morpholinoethane (Irgacure® 907 ex Ciba Specialty Chemicals) and (4-morpholinobenzoyl)-1-benzyl-1-dimethylamino propane (Irgacure® 369 ex Ciba Specialty Chemicals) disclosed in EP 0898202 A. Preferred is an α-amino acetophenone according to the following formula

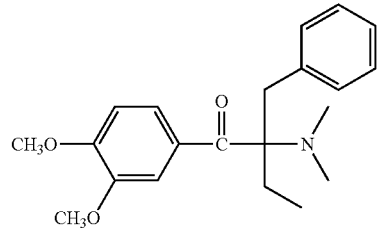

The photolatent base may be used in an amount of between 0.01 and 10 wt. % on solid curable material of coating composition a), preferably 0.05 to 5 wt. %, more preferably 0.05 to 3 wt. %.

If coating composition a) comprises a photolatent base, it is radiation curable after application and, optionally, evaporation of solvents. Curing by irradiation with UV light is particularly suitable. Combinations of IR/UV irradiation are also suitable. Radiation sources which may be used are those customary for UV, such as high- and medium-pressure mercury lamps. In order to avoid any risk involved in handling UV light of very short wavelength (UV B and/or UV C light), preference is given, especially for use in automotive refinishing shops, to fluorescent lamps which produce the less injurious UV A light. Alternatively, it is also possible to use UV lamps equipped with a filter which does not allow the transmission of UV B and UV C radiation.

When a photolatent base is used in coating composition a), a sensitizer may optionally be included in coating composition a).

Suitable sensitizers are thioxanthones such as isopropyl thioxanthone according to the following formula

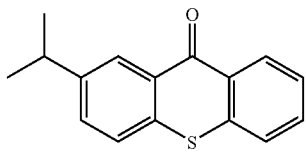

(Quantacure® ITX ex G. Lakes), oxazines, and rhodamines. Colourless surfaces can be obtained with benzophenone and derivatives thereof. Examples of suitable derivatives of benzophenone are:

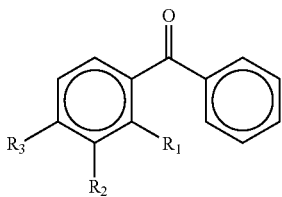

wherein $R_1$, $R_2$, and $R_3$ may be the same or different and stand for $CH_3$ or H (Speedcure® BEM ex Lambson),

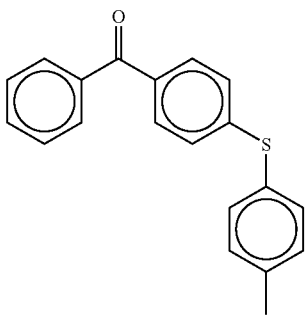

(Quantacure® BMS ex G. Lakes), and

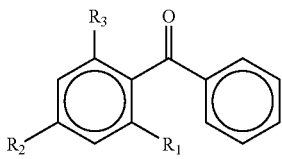

wherein $R_1$, $R_2$, and $R_3$ may be the same or different and stand for $CH_3$ or H (Esacure® TZT ex Lamberti).

The sensitizer may be present in amount of 0.1 to 5 wt % on solid curable material in coating composition a), preferably 0.5 to 2.5 wt. %.

In addition to the isocyanate-functional compound and the thiol-functional compound as described above, other compounds can be present in coating composition a). Such compounds may be main binders and/or reactive diluents, optionally comprising reactive groups which may be crosslinked with the aforesaid functional compounds. Examples include hydroxyl-functional binders, e.g., polyester polyols, polyether polyols, polyacrylate polyols, polyurethane polyols, cellulose acetobutyrate, hydroxyl-functional epoxy resins, alkyds, and dendrimeric polyols such as described in International patent application WO 9317060. Also, hydroxyl-functional oligomers and monomers, such as castor oil and trimethylol propane, may be present.

Coating composition a) can also comprise latent hydroxyl-functional compounds such as compounds comprising bicyclic orthoester or spiro-orthoester groups. These compounds and their use are described in WO 9731073.

Finally, ketone resins, asparagyl acid esters, and latent or non-latent amino-functional compounds such as oxazolidines, ketimines, aldimines, diimines, secondary amines, and polyamines can be present. These and other compounds are known to the skilled person and are mentioned, int. al., in U.S. Pat. No. 5,214,086.

The ratio of isocyanate-functional to thiol-functional groups in coating composition a) suitably is between 0.5:1 and 3:1, preferably 0.8:1 to 2:1.

Coating composition a) may further comprise other ingredients, additives or auxiliaries commonly used in coating compositions, such as pigments, dyes, emulsifiers (surfactants), pigment dispersion aids, levelling agents, wetting agents, anti-cratering agents, antifoaming agents, antisagging agents, heat stabilizers, light stabilizers, UV absorbers, antioxidants, and fillers.

If hydroxyl-functional compounds are present in coating composition a), the composition preferably comprises one or more catalysts for the crosslinking of isocyanate groups with hydroxyl groups. Examples thereof include Sn-based catalysts, such as dibutyl tin dilaurate, dibutyl tin diacetate, and tin octoate. Also basic catalysts are suitable.

As mentioned above, the aqueous coating composition b) comprises at least 17 mmol/kg, calculated on the weight of coating composition b), of a catalyst for the addition reaction of the at least one thiol-functional compound and the at least one isocyanate-functional compound of coating composition a). Such an amount of catalyst causes a measurable increase in the drying speed of coating composition a) upon application on the surface of a coating layer prepared from coating composition b). The actual amount of catalyst employed in coating composition b) further depends on the specific catalytic activity of the individual catalyst, on the equivalent weight of the catalyst, on the proportion of other components in coating composition b), on the type of isocyanate-functional compound selected, and on the required cure speed of coating composition a). Therefore, the most suitable amount of catalyst in coating composition b) may vary in very wide ranges. Generally, the amount of catalyst in coating composition b) is in the range of 17 millimol to 10 mol of catalyst per kg of coating composition, or 35 millimol to 9 mol per kg, or 50 millimol to 8 mol per kg, or 200 millimol to 7 mol per kg.

Suitable catalysts in the aqueous coating composition b) are all compounds capable of accelerating the addition reaction of thiol-functional compounds and isocyanate-functional compounds.

Generally, suitable catalysts are basic catalysts. Examples are inorganic basic compounds, such as hydroxides and basic oxides of metals. The hydroxides of lithium, sodium, potassium, calcium, and magnesium may be explicitly mentioned.

Quarternary ammonium hydroxides, such as tetraethylammonium hydroxide, can also be used as catalyst in coating composition b).

Furthermore, amines are suitable catalysts in coating composition b).

Suitable primary amines are, for example, isopropyl amine, butyl amine, ethanol amine, 3-amino-1-propanol, 1-amino-2-propanol, 2-amino-2-methyl-1-propanol or 2-amino-2-methyl-1,3-propane diol. Secondary amines that can be used are, for example, morpholine, diethyl amine, dibutyl amine, N-methyl ethanol amine, diethanol amine, and diisopropanol amine. Also suitable are diamines and polyamines, such as the addition products of epoxides and ammonia or the addition products of epoxides and primary, secondary or tertiary amines.

Tertiary amines are a particularly suitable class of basic catalysts. Examples of suitable tertiary amines include trimethyl amine, triethyl amine, triisopropyl amine, triisopropanol amine, N,N-dimethyl ethanol amine, dimethyl isopropyl amine, N,N-diethyl ethanol amine, 1-dimethyl amino-2-propanol, 3-dimethyl amino-1-propanol, 2-dimethyl amino-2-methyl-1-propanol, N-methyl diethanol amine, triethanol amine, N-ethyl diethanol amine, N-butyl diethanol amine, N,N-dibutyl ethanol amine, and N-ethyl morpholine. N,N-dimethyl ethanol amine is a preferred catalyst in coating composition b).

Also suitable are 1,4-diazabicyclo[2.2.2]octane, 1,8-diazabicyclo[5.4.0]undec-7-ene, 1,5-diazabicylo[4.3.0]non-5-ene, guanidine, guanine, guanosine, melamine, and mixtures and derivatives thereof.

The amine catalyst in coating composition b) can also be an amine-functional, optionally film-forming, polymer or resin, such as a (co)polymer of 2-(dimethylamino)ethyl (meth) acrylate.

When the catalyst in coating composition b) is a base, it is preferred that the base is present as such, as compared to being present in blocked or neutralized form.

The catalyst in coating composition b) can alternatively be a metal compound with an organic ligand where the metal is a metal of Groups 3 to 13 of the Periodic Table. Preferably, the metal is a transition metal. More preferably, the metal is a metal of Group 4 of the Periodic Table.

The metal compounds comprise metal salts and/or complexes of organic compounds. The organic compounds are groups having 2 to 40 carbon atoms, optionally comprising atoms such as O, N, and S. The metal salts comprise anions selected from the groups of carboxylates. Examples thereof include propionate, butyrate, pentanoate, 2-ethyl hexanoate, naphthenate, oxalate, malonate, succinate, glutamate, and adipate. The metal complexes comprise ligands selected from the group of beta-diketones, alkyl acetoacetates, alcoholates, and combinations thereof. Examples thereof include acetyl acetone (2,4-pentanedione), 2,4-heptanedione, 6-methyl-2,4-heptadione, 2,4-octane-dione, propoxide, isopropoxide, and butoxide. Preferably, the metal compound is a metal complex.

Examples of metals include aluminium, titanium, zirconium, and hafnium. Examples of metal complexes include aluminium complexed with 2,4-pentanedione (K-KAT® XC5218 ex King Industries), aluminium triacetyl acetonate, zirconium tetraacetyl acetonate, zirconium tetrabutoxide (Tyzor® NBZ ex Dupont), titanium tetrabutoxide (Tyzor® TBT ex Dupont), zirconium complexed with 6-methyl-2,4-heptadione, K-KAT® XC6212 ex King Industries, aluminium triisopropoxide, and titanium diisopropoxide bis-2,4(pentadionate) (Tyzor® AA ex DuPont).

Still another class of suitable catalysts in coating composition b) are co-catalysts comprising a phosphine and a Michael acceptor, such as described in International patent application WO 0168736. When such co-catalysts are used, it is possible that both components of the co-catalyst, i.e. the phosphine and the Michael acceptor, are present in coating composition b). Alternatively, it is also possible to include only one of the components in coating composition b) and to include the other component in coating composition a). Thus, when coating composition b) comprises a Michael acceptor, coating composition a) may comprise a phosphine. It is equally possible to include the phosphine in coating composition b) and to include the Michael acceptor ion coating composition a). The phosphine employed as one of the co-catalysts is a compound according to the formula $Z(PR_2)_n$, wherein n is an integer of 1 to 6, R is independently selected from an aryl group or (cyclo)alk(en)yl group which may be linear or branched and may or may not contain one or more heteroatoms such as oxygen atoms and halogen atoms, provided that the oxygen heteroatoms are not directly linked to a phosphorus atom. Preferably, R is an alkyl or aryl group, more preferably the alkyl group has 1 to 15 carbon atoms and the aryl group has 6 to 15 carbon atoms.

In the event that n=1, Z is a group according to R. Such compounds are hereinafter referred to as monophosphines. Examples of monophosphines include triphenyl phosphine and trioctyl phosphine.

In the event that n≧2, Z is selected from an arylene group, a (cyclo)alk(en)yl-(id)ene group which may be linear or branched and may or may not contain heteroatoms such as oxygen, phosphorus, nitrogen, provided that the oxygen and nitrogen heteroatoms are not directly linked to a phosphorus atom, and/or groups selected from carboxyl, anhydride, cycloalkyl, aryl, or it may be a single bond. These compounds are hereinafter referred to as polyphosphines. Examples of the polyphosphines include bis(2-diphenylphosphinoethyl)-phenylphosphine, 1,4-bis(diphenylphosphino)butane, bis(diphenylphosphino)-methane, 1,3-bis(diphenylphosphino)propane, 1,5-bis(diphenylphosphino)-pentane, trans-1,2-bis(diphenylphosphine)ethylene, cis-1,2-bis(diphenylphosphino)ethylene, (R)-(+)-2,2'-bis(diphenylphosphino)-1,1'-binaphtyl, tetra-phenylbiphosphine, tris 2-(diphenylphosphino)(ethyl)phosphine, 1,1-bis-(diphenylphosphino)ethylene, 1,1,1-tris(diphenylphosphinomethyl)ethane, 2,3-bis(diphenylphosphino)maleic anhydride, 1,2-bis(diphenylphosphino)benzene, 1,2-bis(pentafluorophenyl)(phosphino)ethane, (2R,3R)-(–)-2,3-bis(diphenylphosphino)bicyclo[2.2.1]hept-5-ene, and ethylene-bis(2-methoxyphenyl) (phenylphosphine). Preferred are polyphosphines wherein Z is a alkylene group, linear or branched, having 1 to 8 carbon atoms optionally comprising a phosphorus atom and R is an aryl group. The most preferred phosphines are 1,4-bis(diphenylphosphino)butane or triphenylphosphine.

The Michael acceptor preferably comprises one or more olefinically unsaturated groups, the olefinically unsaturated group comprising at least one electron-withdrawing functionality linked to a carbon atom of the unsaturated bond. The olefinically unsaturated bond may be a double or a triple bond. Generally, the Michael acceptor has a structure according to the following formula I:

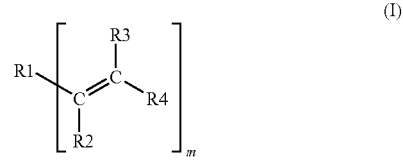

(I)

wherein at least one of R1, R2, R3, and R4 comprises an electron-withdrawing functionality linked to a carbon atom of the unsaturated bond and m is an integer from 1 to 6.

Examples of the electron-withdrawing functionality include carbonyl, carboxyl, ester, thiocarbonyl, thiocarboxyl, thioesters, sulfoxide, sulfonyl, sulfo, phosphate, phosphite, phosphonite, phosphinite, nitro, nitrile, and amide.

In the event that m is 1, at least one of R1, R2, R3, and/or R4 comprises the electron-withdrawing functionality and the electron-withdrawing functionality may be attached to a hydrogen atom, linear or branched alkyl, cycloalkyl, alkenyl, cyclo-alkenyl, alkynyl, cyclo-alkynyl, and aryl which may optionally be substituted with various other functionalities, such as carboxylic acid or hydroxide. If they do not comprise an electron-withdrawing functionality, R1, R2, R3, and/or R4 may be independently selected from a hydrogen atom, linear or branched alkyl, cycloalkyl, alkenyl, cyclo-alkenyl, alkynyl, cyclo-alkynyl, and aryl which may optionally be substituted with various functionalities, such as carboxylic acid or hydroxide. R1 and R3 or R2 and R4 may also form a ring comprising one or more electron-withdrawing functionalities.

In the event that m is 2 to 6, R1 is selected from a single bond, an electron-withdrawing functionality, and a polyvalent group derived from a hydrocarbon compound optionally comprising hetero atoms such as —O—, —S—, —Si—, and —P—, groups such as amide, urea, and ester groups, and/or one or more electron-withdrawing functionalities. The hydrocarbon compound may be a substituted or unsubstituted alkane, cycloalkane, alkene, cycloalkene, alkyne, cycloalkyne, arene, or combinations thereof. The polyvalent group is preferably derived from a polyalcohol. Examples of such polyalcohols include trimethylol propane, trimethylol ethane, glycerol, 1,2,6-hexanetriol, ethylene glycol, 1,2-propylene glycol, 1,3-propylene glycol, 2-methylpropane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentanediol, 3-methyl-pentanediol, 1,6-hexanediol, 2,2,4-trimethyl pentane-1,3-diol, dimethylol propionic acid, pentaerythritol, di-trimethylol propane, and dipentaerythritol. Alternatively, R3 may also form a ring with R1 comprising one or more electron-withdrawing functionalities.

Examples of Michael acceptors are isobornyl acrylate, isooctyl acrylate, 2,2'-methylene bis(6-t.butyl 4-methyl phenol) monoacrylate, phenoxyethyl acrylate, lauryl acrylate, dicyclopentadiene acrylate, N-butyl maleimide, benzyl acrylate, trimethylol propane tri-acrylate, maleic anhydride, a trifunctional adduct of isophorone diisocyanate to 2-hydroxyethyl maleimide, diethyl maleate, methoxypropyl citraconimide, diethylbenzylidene malonate, or an α,β-unsaturated aldehyde, e.g., cinnamaldehyde or citral. Examples of preferred Michael acceptors are trimethylol propane triacrylate, Irganox 3052 or N-butyl maleimide.

In one embodiment of the multilayer coating system coating composition b) consists essentially of the above-described catalyst and water as liquid carrier. In this case, layer b) of the multilayer coating system consists essentially of the above-described catalyst after evaporation of water.

In another embodiment coating composition b) also comprises a film-forming binder. The film-forming binder in coating composition b) can be any resin normally used in aqueous coating compositions, such as polyaddition polymer, polyurethane, polyester, polyether, polyamide, polyurea, polyurethane-polyester, polyurethane-polyether, cellulose based binders, such as cellulose acetobutyrate, and/or hybrid resins. These resins can be present in the aqueous coating composition b) in the form of a solution in the aqueous carrier medium or in the form of a dispersion in the aqueous carrier medium.

As suitable polyaddition polymer resins may be mentioned the (co)polymers of ethylenically unsaturated monomers. The polyaddition polymer can be prepared by conventional methods of free radical-initiated polymerization. Alternatively, advanced polymerization techniques, such as group transfer polymerization (GTP), atom transfer radical polymerization (ATRP), and reversible addition fragmentation chain transfer (RAFT) polymerization, can also be used for the preparation of polyaddition polymer resins.

The polyaddition polymer may be an acrylic polyol derived from hydroxy-functional acrylic monomers, such as hydroxyethyl(meth)acrylate, hydroxy-propyl (meth)acrylate, hydroxybutyl(meth)acrylate, other acrylic monomers such as (meth)acrylic acid, methyl(meth)acrylate, butyl (meth)acrylate, isobutyl (meth)acrylate, optionally in combination with a vinyl derivative such as styrene, and the like, or mixtures thereof, the terms (meth)acrylate and (meth)acrylic acid referring to both methacrylate and acrylate, as well as methacrylic acid and acrylic acid, respectively.

In one embodiment the resin in coating composition b) is an aqueous dispersion of an addition polymer. The aqueous dispersion may be mixed with a metallic pigment such as aluminium, or a pigment such as a metal oxide-coated mica, so that coats of a metallic appearance may be obtained.

The addition polymer suitably is a copolymer prepared in 2 or more steps by emulsion polymerization, and obtained by copolymerization in a first step of 60-95 parts by weight, calculated on 100 parts by weight of the addition polymer, of a monomer mixture A consisting of 65-100 mole % of a mixture of 60-100 mole % of a (cyclo)alkyl(meth)acrylate of which the (cyclo)alkyl group contains 4-12 carbon atoms, and 0-40 mole % of a di(cyclo)alkyl maleate and/or a di(cyclo) alkyl fumarate of which the (cyclo)alkyl groups contain 4-12 carbon atoms, and 0-35 mole % of a different, copolymerizable, monoethylenically unsaturated monomer, and by copolymerization in a subsequent step of 5-40 parts by weight (calculated on 100 parts by weight of the addition polymer) of a monomer mixture B of 10-60 mole % of (meth)acrylic acid and 40-90% of a different, copolymerizable, monoethylenically unsaturated monomer, with the carboxylic acid groups derived from the (meth)acrylic acid being at least partially ionized. Preferably, the addition polymer is obtained by copolymerization of 80-90 parts by weight of the monomer mixture A and 10-20 parts by weight of the monomer mixture B, both amounts being calculated on 100 parts by weight of the addition polymer. By emulsion polymerization is meant here the polymerization of an ethylenically unsaturated monomer in water in the presence of a water soluble or water insoluble initiator and using 0.1-9 weight-%, calculated on the monomer, of an emulsifier.

As examples of (cyclo)alkyl(meth)acrylates suitable for use in monomer mixture A and having a (cyclo)alkyl group with 4-12 carbon atoms may be mentioned: butyl acrylate, butyl methacrylate, 2-ethylhexyl acrylate, 2-ethylhexyl methacrylate, octyl acrylate, octyl methacrylate, isobornyl acrylate, isobornyl methacrylate, dodecyl acrylate, dodecyl methacrylate, cyclohexyl acrylate, and cyclohexyl methacrylate. It is preferred that the monomer mixture A should contain 70-95, more particularly 80-95 mole % of the aforementioned (cyclo)alkyl(meth)acrylate. As examples of di(cyclo) alkyl maleates and/or fumarates with (cyclo)alkyl groups having 4-12 carbon atoms suitable for use in monomer mixture A may be mentioned: dibutyl maleate, dibutyl fumarate, 2-ethylhexyl maleate, 2-ethylhexyl fumarate, octyl maleate, isobornyl maleate, dodecyl maleate, and cyclohexyl maleate.

As suitable monomeric, monoethylenically unsaturated compounds of which maximally 35, and preferably 5-20 mole % may be used in the monomer mixture A may be mentioned: alkyl(meth)acrylates having fewer than 4 C-atoms in the alkyl group, such as methyl methacrylate, methyl acrylate, ethyl acrylate, ethyl methacrylate, propyl acrylate, propyl methacrylate, isopropyl acrylate; alkyl maleates and fumarates having fewer than 4 C-atoms in the alkyl groups, such as dimethyl maleate, diethyl maleate, diethyl fumarate, and dipropyl maleate; (meth)acrylates having ether groups such as 2-methoxyethyl methacrylate, 2-ethoxyethyl methacrylate, 3-methoxypropyl acrylate; hydroxyalkyl(meth)acrylates, e.g. 2-hydroxyethyl acrylate, 2-hydroxyethyl methacrylate, 2-hydroxypropyl acrylate, 2-hydroxypropyl methacrylate, 4-hydroxybutyl acrylate, 6-hydroxyhexyl acrylate, p-hydroxycyclohexyl acrylate, p-hydroxycyclohexyl methacrylate, hydroxypolyethylene glycol (meth)acrylates, hydroxypolypropylene glycol (meth)acrylates and the corresponding alkoxy derivatives thereof; epoxy(meth)acrylates, such as glycidyl acrylate, glycidyl methacrylate; monovinyl aromatic hydrocarbons, such as styrene, vinyl toluene, α-methyl styrene, vinyl naphthalene; also acrylamide and methacrylamide, acrylonitrile, methacrylonitrile, N-methylol acrylamide, N-methylol methacryl-amide; N-alkyl(meth)acrylamides, such as N-isopropyl acrylamide, N-isopropyl methacrylamide, N-t-butyl acrylamide, N-t-octyl acrylamide, N,N-dimethyl aminoethyl methacrylate, N,N-diethyl aminoethyl methacrylate; monomers, such as vinyl chloride, vinyl acetate, vinyl propionate, and monomers containing one or more urea or urethane groups, such as for instance the reaction product of 1 mole of isocyanatoethyl methacrylate and 1 mole of butylamine, 1 mole of benzylamine, 1 mole of butanol, 1 mole of 2-ethylhexanol, and 1 mole of methanol, respectively. Mixtures of these compounds may also be used. Since in the first step a non-cross-linked polymer should be formed, the monomers in the monomer mixture A do not contain any groups which react with each other. As examples of monoethylenically unsaturated compounds which may be used in the monomer mixture B in addition to the (meth)acrylic acid may be mentioned: monovinyl aromatic hydrocarbons, such as styrene, vinyl toluene, α-methyl styrene, and vinyl naphthalene; nitriles, such as acrylonitrile, methacrylonitrile; acrylic or methacrylic esters, such as methyl methacrylate, methyl acrylate, ethyl acrylate, ethyl methacrylate, propyl acrylate, propyl methacrylate, isopropyl acrylate, butyl acrylate, butyl methacrylate, 2-hydroxyethyl acrylate, 2-hydroxyethyl methacrylate, 2-hydroxypropyl acrylate, 2-hydroxypropyl methacrylate, 4-hydroxybutyl acrylate, 6-hydroxyhexyl acrylate, p-hydroxycyclohexyl acrylate, 2-ethylhexyl acrylate, 2-methoxyethyl methacrylate, 2-ethoxyethyl methacrylate, 3-methoxypropyl acrylate; hydroxy-polyethylene glycol (meth)acrylates, hydroxypolypropylene glycol (meth)acrylates and the corresponding alkoxy derivatives thereof; ethylenically unsaturated monocarboxylic acids such as crotonic acid and itaconic acid, and compounds such as vinyl chloride, vinyl acetate, vinyl propionate, vinyl pyrrolidone, acrylamide, methacrylamide, N-alkyl(meth)acrylamides such as N-isopropyl acrylamide, N-t-butyl acrylamide, N-t-octyl acrylamide. Mixtures of these compounds may also be used. It is preferred that the monomer mixture B should contain 15-50, more particularly 20-40 mole % of (meth)acrylic acid and 50-85, more particularly 60-80 mole % of the different, copolymerizable, ethylenically unsaturated monomer. Copolymerization of the monomer mixture B will generally yield a copolymer having an acid number of 30-450 and preferably of 60-350, and a hydroxyl number of 0-450 and preferably of 60-300. Both the acid number and the hydroxyl number are expressed in mg of KOH per g of copolymer. Optionally, different monomer mixtures A and/or B may be used successively.

The emulsifiers of which use is preferably made in the emulsion polymerization are of an anionic or non-ionic nature. Examples of anionic emulsifiers include: potassium laurate, potassium stearate, potassium oleate, sodium decyl sulfate, sodium dodecyl sulfate, and sodium rosinate. Examples of non-ionic emulsifiers include: linear and branched alkyl and alkylaryl polyethylene glycol, and polypropylene glycol ethers and thioethers, alkyl phenoxypoly(ethyleneoxy) ethanols such as the adduct of 1 mole of nonyl phenol to 5-12 moles of ethylene oxide, or the ammonium salt of the sulfate of this adduct. Also, in emulsion polymerization the conventional radical initiators may be used in the usual amounts. Examples of suitable radical initiators include: ammonium persulfate, sodium persulfate, potassium persulfate, bis(2-ethylhexyl) peroxydicarbonate, di-n-butyl peroxydicarbonate, t-butyl perpivalate, t-butyl hydroperoxide, cumene hydroperoxide, dibenzoyl peroxide, dilauroyl peroxide, 2,2'-azobisiso-butyronitrile, and 2,2'-azobis-2-methylbutyronitrile. As suitable reducing agents which may be used in combination with e.g. a hydroperoxide may be mentioned: ascorbic acid, sodium sulfoxylate formaldehyde, thiosulfates, bisulfates, hydrosulfates, water-soluble amines such as diethylene triamine, triethylene tetraamine, tetraethylene pentamine, N,N'-dimethyl ethanolamine, N,N-diethyl ethanolamine, and reducing salts such as cobalt, iron, nickel, and copper sulfate. Optionally, a chain length regulator, for instance n-octyl mercaptan, dodecyl mercaptan, 3-mercaptopropionic acid, may also be used. Copolymerization of the monomer mixtures generally is carried out at atmospheric pressure at a temperature of 40-100° C., preferably 60-90° C., in an atmosphere of an inert gas, such as nitrogen. Optionally, however, copolymerization may also be carried out at elevated pressure and at a temperature of 40-100° C. or higher.

The carboxylic acid groups derived from the acrylic acid and/or methacrylic acid are at least 40-100% ionized by the addition of 0.5-1.5, preferably 0.8-1.3 equivalents of an ionizing agent per equivalent of carboxylic acid group. As suitable ionizing agents for the carboxylic acid may be mentioned ammonia and amines such as N,N-dimethyl ethanolamine, N,N-diethyl ethanolamine, triethyl amine, and morpholine. It is preferred that the ionizing of the carboxylic acid groups should be carried out after the polymerization.

Coating composition b) may optionally comprise at least a second resin. Such a second resin is not identical to the resin already present in composition b) and can be selected from the same group of polyaddition polymer, polyester, polyurethane, polyether resins or a mixture thereof.

Suitable polyurethanes may in general be prepared from polyisocyanates and polyols as known by the skilled man. Examples thereof include Neorez R970 (ex NeoResins) and Daotan VTW 2275 (ex Vianova Resins). Also included in the definition of polyurethanes are hybrids of polyurethanes such as polyurethane acrylate hybrids. Examples thereof include Neopac E115 (ex NeoResins) and Daotan VTW 6460 (ex Vianova Resins).

Preferably, the polyurethane is a polyurethane polyurea. More preferably, the polyurethane polyurea comprises:
i) at least 200 millimol per 100 g of solids of chemically incorporated carbonate groups —O—CO—O—, and
ii) a combined total of up to 320 millimol per 100 g of solids of chemically incorporated urethane groups —NH—CO—O— and chemically incorporated urea groups —NH—CO—NH—.

Such polyurethane polyurea dispersions are known from DE 39 36 794. Preferably, the polyurethane polyurea comprises at least 250 millimol, per 100 g of solids content, of chemically incorporated carbonate groups —O—CO—O—, and a combined total of 200 to 300 milliequivalents, per 100 g of solids content, of urethane groups —NH—CO—O— and urea groups —NH—CO—NH—. Polyurethane polyurea may be prepared in a known manner by reacting
a) organic polyisocyanates which contain no hydrophilic groups or groups convertible into hydrophilic groups with
b) relatively high-molecular weight organic polyhydroxyl compounds which have no hydrophilic groups or groups convertible into hydrophilic groups,
c) optionally, low-molecular weight compositions containing at least two isocyanate-reactive groups but no hydrophilic groups or groups capable of conversion into hydrophilic groups,
d) optionally, non-ionic hydrophilic starting components containing at least one isocyanate group or at least one isocyanate-reactive group, and
e) optionally, starting components containing at least one ionic group or at least one group capable of conversion into an ionic group, as well as at least one isocyanate-reactive hydrogen atom, provided that the quantities of non-ionic groups and ionic groups present in components d) and e) are sufficient to ensure the dispersibility of the polyurethane polyureas in water.

The reaction between isocyanate groups and hydroxyl groups results in urethane groups, while any urea groups present in the reaction products are formed from amine-functional starting components and/or the reaction between isocyanate groups and the dispersing water, which is always possible during the preparation of the aqueous polyurethane dispersions.

Polyisocyanate component a) includes any polyisocyanate known from polyurethane chemistry. These polyisocyanates generally have a molecular weight of 112 to 1,000, preferably 140 to 400. Suitable polyisocyanates are those which correspond to the formula Q(NCO)n, wherein Q represents an organic group obtained by removing the isocyanate groups from an organic polyisocyanate having a molecular weight of 112 to 1,000, preferably 140 to 400, and n stands for a number from 2 to 4, preferably 2 or 3, and more preferably 2. In the above formula Q preferably represents a divalent aliphatic hydrocarbon group having 4 to 18 carbon atoms, a divalent cycloaliphatic hydrocarbon group having 5 to 15 carbon atoms, a divalent aromatic hydrocarbon group having 6 to 15 carbon atoms or an araliphatic hydrocarbon group having 7 to 15 carbon atoms. Examples of suitable polyisocyanates include tetramethylene diisocyanate, 1,6-diisocyanatohexane (HDI) dodeca-methylene diisocyanate, 2,2,4-trimethylhexane diisocyanate, undecane diisocyanate-(1,11), lysine ester diisocyanate, cyclohexane-1,3- and -1,4-diisocyanate, 1-isocyanato-3-isocyanatomethyl-3,5,5-trimethyl cyclohexane (IPDI), and 4,4'-diisocyanato dicyclohexylmethane. Also suitable are aromatic diisocyanates such as 2,4-diisocyanato toluene and/or 2,6-diisocyanato toluene, 4,4"-diisocyanato diphenyl methane, and 1,4-diisocyanato isopropyl benzene. HDI, IPDI, and mixtures of these diisocyanates are particularly preferred. Component b) includes organic polyhydroxyl compounds having a molecular weight of 300 to 5,000, preferably from 500 to 3,000, and containing at least 50% by weight, preferably more than 70% by weight, of polyhydroxy polycarbonates. The polyhydroxy polycarbonates are esters of carbonic acid obtained by the reaction of carbonic acid derivatives, e.g., diphenyl carbonate or phosgene, with diols. Examples of these diols include ethylene glycol, propane-1, 2- and 1,3-diol, butane-1,4- and -1,3-diol, hexane-1,6-diol, octane-1,8-diol, neopentyl glycol, 1,4-bis-hydroxymethyl cyclohexane, 2-methyl-propane-1,3-diol, 2,2,4-trimethyl-pentane-1,3-diol, diethylene glycol, tri- and tetraethylene glycol, dipropylene glycol, polypropylene glycols, dibutylene glycol, polybutylene glycols, Bisphenol A and tetrabromo Bisphenol A. The diol component preferably contains from 40 to 100% by weight of a hexane diol, preferably hexane-1,6-diol, and/or hexane diol derivatives preferably containing ether or ester groups in addition to terminal OH groups, e.g., the products obtained by the reaction of 1 mole of hexane diol with ≧1 mole, preferably 1 to 2 moles, of caprolactone according to DE 17 70 245 or the products obtained by the self-etherification of hexane diol to form dihexylene or trihexylene glycol according to DE 15 70 540. The polyether polycarbonate diols described in DE 37 17 060 are also very suitable.

The hydroxyl polycarbonates should be substantially linear although they may, if desired, be slightly branched by the incorporation of polyfunctional components, in particular low-molecular weight polyols such as glycerol, trimethylol propane, hexane-1,2,6-triol, butane-1,2,4-triol, trimethylol propane, pentaerythritol, quinitol, mannitol and sorbitol, methyl glycoside and 1,4,3,6-dianhydrohexitols. In addition to the polyhydroxy polycarbonates, starting component b) may contain other known polyhydroxyl compounds having the previously described molecular weights, e.g., b1) dihydroxy polyesters obtained from dicarboxylic acids such as succinic acid, adipic acid, suberic acid, azelaic acid, sebacic acid, phthalic acid, isophthalic acid, terephthalic acid, tetrahydrophthalic acid, and from diols such as ethylene glycol, propane-1,2-diol, propane-1,3-diol, diethylene glycol, butane-1,4-diol, hexane-1,6-diol, octane-1,8-diol, neopentyl glycol, 2-methyl propane-1,3-diol, and the various isomeric bis-hydroxymethyl cyclohexanes;
b2) polylactones such as the polymers of ε-caprolactone initiated with the above-mentioned dihydric alcohols; and
b3) polyethers, e.g., the polymers or copolymers of tetrahydrofuran, styrene oxide, propylene oxide, ethylene oxide, the butylene oxides or epichloro-hydrin initiated with divalent starter molecules such as water, the above-mentioned diols or amines containing 2 NH bonds, in particular the polymers and copolymers of propylene oxide and optionally ethylene oxide. Ethylene oxide may be used as a portion of the total quantity of ether molecules, provided the resulting polyether diol contains not more than 10% by weight of ethylene oxide units. It is preferred to use polyether diols which have been obtained without the addition of ethylene oxide, especially those based on propylene oxide and tetrahydrofuran alone.

The optionally used starting components c) are known low-molecular-weight compounds which have a molecular weight below 300, contain hydroxyl and/or amino groups, and are at least difunctional in isocyanate addition reactions. Compounds which are difunctional in isocyanate addition reactions (chain extenders), compounds which are at least trifunctional in isocyanate addition reactions (cross-linking agents), and mixtures of such compounds may be used as starting components c). Examples of these compounds include low-molecular-weight polyhydric alcohols such as ethylene glycol, propane-1,2- and -1,3-diol, butane-1,4- and -1,3-diol, hexane-1,6-diol, octane-1,8-diol, neopentyl glycol, 1,4-bis-hydroxymethyl cyclohexane, 2-methyl-propane-1,3-diol, 2,2,4-trimethyl pentane-1,3-diol, glycerol, trimethylol propane, trimethylol ethane, the isomeric hexane triols and pentaerythritol; low-molecular-weight diamines such as ethylene diamine, 1,2- and 1,3-diaminopropane, 1,3-, 1,4- and 1,6-diamino-hexane, 1,3-diamino-2,2-dimethyl propane, isophorone diamine, 4,4'-diamino-dicyclohexyl methane, 4,4-diamino-3,3'-dimethyldicyclohexyl methane, 1,4-bis-(2-amino-prop-2-yl)-cyclohexane, hydrazine, hydrazide, and mixtures of such diamines and hydrazines; higher functional polyamines such as diethylene triamine, triethylene tetramine, dipropylene triamine, and tripropylene tetramine; hydrogenated products of addition of acrylonitrile to aliphatic or cycloaliphatic diamines, preferably those obtained by the addition of an acrylonitrile group to a molecule of a diamine, e.g., hexamethylene propylene triamine, tetramethylene propylene triamine, isophorone propylene triamine or 1,3- or 1,3-cyclohexane propylene triamine, and mixtures of such polyamines.

The hydrophilic starting components d) are compositions containing ethylene oxide units incorporated within polyether chains, specifically:

d1) diisocyanates and/or compositions which contain isocyanate-reactive hydrogen atoms and are difunctional in isocyanate polyaddition reactions, the diisocyanates and compositions also containing polyether side chains containing ethylene oxide units, and d2) monoisocyanates and/or compositions which are monofunctional in isocyanate polyaddition reactions and contain an isocyanate-reactive hydrogen atom, the monoisocyanates and compositions also containing terminal polyether chains containing ethylene oxide units, and d3) mixtures of d1) and d2).

The preparation of these hydrophilic starting components is carried out by methods analogous to those described in U.S. Pat. No. 3,920,598, U.S. Pat. No. 3,905,929, U.S. Pat. No. 4,190,566, and U.S. Pat. No. 4,237,264.

The compounds used as starting component e) have at least one isocyanate-reactive group and at least one (potentially) ionic group. They include the alcohols-containing tertiary amino groups, hydroxy carboxylic acids, hydroxy sulfonic acids, amino carboxylic acids, and amino sulfonic acids disclosed in U.S. Pat. No. 3,479,310. Instead of these starting components containing potentially ionic groups, the corresponding salt type derivatives thereof may be used, i.e. ionic groups formed by the quaternization or neutralization of the potentially ionic groups. Examples of suitable quaternizing and neutralizing agents for converting the potentially ionic groups into ionic groups are also set forth in U.S. Pat. No. 3,479,310. When potentially ionic starting components are used, the at least partial conversion of the potentially ionic groups into ionic groups is carried out by quaternization or neutralization after or during preparation of the polyurethane polyureas.

Preferred starting components e) include 2,2-bis-(hydroxy-methyl)-alkane monocarboxylic acids having a total of 5 to 8 carbon atoms and/or salts thereof obtained by partial or complete neutralization with organic amines or $NH_3$. 2,2-dimethylol propionic acid (2,2-bis-hydroxymethyl propionic acid) and/or salts thereof are particularly preferred for use as starting component e).

Preparation of the polyurethanes from the starting components a) to e) is carried out in a known manner in one or more stages using the reactants in such proportions that the equivalent ratio of isocyanate groups present in the starting components to isocyanate-reactive groups present in the starting components is 0.8:1 to 2:1, preferably 0.95:1 to 1.5:1, and more preferably 0.95:1 to 1.2:1.

Component d) is used in a quantity such that the polyurethane polyurea contains 0 to 30% by weight, preferably from 1 to 20% by weight, of ethylene oxide units incorporated into terminal or lateral polyether chains.

The quantity of component e) and the degree of neutralization required to form ionic groups are calculated to ensure that the polyurethane finally obtained contains 0 to 120, preferably 1 to 80 millimol, of ionic groups per 100 g of solids. The total quantity of ethylene oxide units and ionic groups must be sufficient to ensure the dispersibility of the polyurethane polyureas in water.

The reaction of the starting components a) to e) may be carried out in one or more stages, optionally in the presence of an isocyanate-inert, water-miscible solvent, so that the reaction products are obtained in the form of a solution in such a solvent. In this context, the term "solution" denotes either a true solution or a water in oil emulsion which may be formed if, for example, individual starting components are used in the form of aqueous solutions. Examples of suitable solvents include acetone, methylethyl ketone, N-methyl pyrrolidone, and any mixtures of such solvents. These solvents are generally used in such quantities that the reaction products of starting components a) to e) are obtained in the form of a solution having a non-volatile content of 10 to 70% by weight.

When the preparation of polyurethane polyureas is carried out as a single-stage reaction, the starting components containing isocyanate-reactive groups are preferably mixed together and then reacted with the starting components containing isocyanate groups. This reaction preferably is carried out initially in the absence of solvents at temperatures of 50 to 150° C., optionally in the presence of known catalysts.

The viscosity of the mixture increases during the course of the reaction and one of the above-mentioned solvents is therefore gradually added to the mixture. The polyurethane content of the organic solution finally obtained is adjusted to a concentration of 10 to 70% by weight, in particular 15 to 55% by weight.

When a two-stage process is employed, an isocyanate prepolymer preferably is first prepared solvent-free at about 50 to 150° C. from excess quantities of isocyanate-containing starting components and hydroxyl-containing starting components at an NCO/OH equivalent ratio of 1.1:1 to 3.5:1, preferably 1.2:1 to 2.5:1, with or without a solvent, and this isocyanate prepolymer is then taken up in a solvent if no solvent has been used up to this stage. The solution obtained is then further reacted with chain extenders or cross-linking agents c), which are optionally used in the form of aqueous solutions and are preferably starting components of the above-mentioned type containing primary and/or secondary amino groups. The quantity of starting components c) used in the second stage is calculated to ensure that the equivalent ratio of all the starting components used in the first and second stages conforms to the conditions previously stated. The end products of both variations (single-stage and two-stage) are solutions of the reaction products in the above-mentioned solvent having a solids content within the ranges indicated above.

If any potentially ionic groups are present, their at least partial conversion into ionic groups by quaternization or neutralization is advantageously carried out before the addition of the dispersing water. If starting component e) contains carboxyl groups, which is preferred, in particular dimethylol propionic acid, the neutralizing agents used preferably are tertiary amines such as triethylamine, tri-n-butylamine, N,N,N-trimethyl cyclohexylamine, N-methyl morpholine, N-methyl piperazine, N,N-dimethyl ethanolamine, N-methyl piperidine, and triethanolamine. For the neutralization of carboxyl groups it is also preferred to use ammonia under the conditions set forth in EP 0269972 A.

After the addition of water as solvent or dispersing medium, at least the major proportion of the auxiliary solvent used is optionally removed by distillation. The water is used in a quantity which is sufficient to provide a product with a solids content of 10 to 60% by weight, preferably 20 to 45% by weight.

The polyurethane polyureas may also be prepared by other methods known in the art, for example by using hydrazine or diamines as chain extenders c) in a blocked form, i.e. in the form of the corresponding azines or ketimines, as disclosed in U.S. Pat. No. 4,269,748 and U.S. Pat. No. 4,829,122.

Alternatively, the so-called prepolymer mixing process may be used. In this process, an NCO prepolymer is initially prepared as described above and after the at least partial conversion of any potentially ionic groups present into ionic groups, the prepolymer is mixed with water to form an emulsion. The NCO groups of the prepolymer are then brought to reaction in the aqueous phase by the addition of amine-functional chain extenders or cross-linking agents c) and/or by a reaction with water.

One example of such a polyurethane polyurea dispersion is Bayhydrol VPLS 2952 ex Bayer. Mixtures of polyurethanes may be used.

Coating composition b) optionally comprises a curing agent capable of chemical reaction with the functional groups present in coating composition b). Examples of such functional groups are hydroxyl groups. Examples of suitable curing agents capable of chemical reaction are the polyisocyanates described above. In this case coating composition b) is at least partly curable by chemical reaction.

A minor degree of crosslinking in layer b) can be beneficial for the performance of the multilayer coating system, in particular in view of an improved adhesion between layer a) and layer b). Therefore, in a preferred embodiment coating composition b) is a coating composition which dries essentially by physical drying, i.e. by evaporation of water, and to a minor degree by crosslinking.

When coating composition b) dries essentially by crosslinking, the mobility and/or availability of the catalyst at the at least one layer boundary of layer a) and layer b) of the multi-layer system according to the invention may be insufficient to effectively cure coating composition a) in layer a). Accordingly, it is preferred that coating composition b) is not a coating composition comprising a polyisocyanate and a thiol-functional compound.

Coating layer b) preferably is a colour- and/or effect-imparting base coat layer prepared from an aqueous base coat composition. Such a base coat composition usually comprises colour- and/or effect-imparting pigments. Colour- and/or effect-imparting pigments are well known in the art. Aluminium particles and mica particles may be specifically mentioned.

As mentioned above, coating composition b) is an aqueous coating composition. This means that the volatile carrier liquid is mainly water. However, coating composition b) may also comprise minor amounts of organic solvents which are compatible with aqueous coating compositions. As suitable organic solvents may be mentioned ether group-containing alcohols such as butoxyethanol, 1-methoxy-propanol-2,1-ethoxy-propanol-2,1-propoxy-propanol-2,1-butoxy-propanol-2, and 1-isobutoxy-propanol-2; alcohols, such as methanol and hexanol; and diols, such as ethylene glycol and diethylene glycol. The invention also relates to a kit of parts for the preparation of an aqueous base coat composition comprising a toner module comprising at least one resin and at least one colour- and/or effect-imparting pigment, optionally a connector module comprising at least one resin compatible with the resin of the toner module, and a reducer module essentially free of resins and pigments, wherein one of the modules comprises an effective amount of a catalyst for the addition reaction of a thiol-functional compound and a isocyanate-functional compound. Preferably, the effective amount of a catalyst for the addition reaction of a thiol-functional compound and an isocyanate-functional compound is comprised in the connector module or in the reducer module. The catalyst is present in non-neutralized form when the catalyst is a base catalyst.

For the production of the multilayer coating system of the invention coating compositions a) and b) can be applied one after the other without intermediate drying, so called "wet-on-wet" application. Alternatively, there can be an intermediate drying step. The coating compositions a) and b) can be applied in random order and may be a filler composition, a primer composition, a base coat composition, a clear coat composition, and/or a top coat composition. Accordingly, the invention also relates to a process of preparing a multilayer coating system comprising the steps of (i) applying a layer b) of an aqueous coating composition b) comprising at least 17 mmol/kg, calculated on the weight of coating composition b), of a catalyst for the addition reaction of a thiol-functional compound and an isocyanate-functional compound to a substrate, (ii) prior to or subsequent to the application of layer b) applying a layer a) of a coating composition a) comprising at least one isocyanate-functional compound and at least one thiol-functional compound so that layer a) and layer b) have at least one common layer boundary, and (iii) curing layer a) at room temperature or elevated temperature, optionally supported by irradiation with UV and/or visible light.

In one embodiment coating composition b) is first applied on an optionally coated substrate and subsequently coating composition a) is applied on top of coating composition b) in order to obtain the multilayer coating system according to the invention.

Application onto a substrate can be via any method known to the skilled person, e.g., via rolling, spraying, brushing, flow coating, dipping, and roller coating. Preferably, at least one of the coating compositions a) and b) as described above is applied by spraying. Coating composition a) and coating composition b) may also both be sprayable coating compositions.

The coating compositions according to the present invention can be applied to any substrate. The substrate may be, for example, metal, e.g., iron, steel, and aluminium, plastic, wood, glass, synthetic material, paper, leather, or another coating layer, such as a primer or filler layer.

Curing temperatures are generally between 0 and 80° C., or between 20 and 60° C.

A specific application of the coating system is as a base coat/clear coat system, such as is often used in the coating of automobiles and transportation vehicles. In this case coating composition b) may be an aqueous base coat composition and coating composition a) may be a clear coat composition. The coating system and the process are especially useful in the refinish industry, in particular the body shop, to refinish and to repair automobiles. The coating system and the process are also applicable in the automotive industry and for the finishing of large transportation vehicles, such as trains, buses, trucks, and airplanes, and parts thereof.

EXAMPLES

Raw Materials Used

| | |
|---|---|
| Sikkens Autowave ®: | Commercially available water borne modular base coat system from Akzo Nobel Car Refinishes |
| 577, 504, 098, 888EC, 888YA | Commercially available modules of Sikkens Autowave from Akzo Nobel Car Refinishes |
| Activator WB: | Commercially available aqueous reducer from Akzo Nobel Car Refinishes |
| Tolonate HDT LV: | Polyisocyanate from Rhodia |
| Sanduvor 3206: | Light stabilizer from Clariant |
| Byk 306: | Wetting additive from Byk Chemie |
| DMEA: | N,N-Dimethyl ethanolamine |

Preparation of a Polyester Polyol 1:

A polyester polyol was prepared from the following components:

| | |
|---|---|
| Hexahydrophthalic anhydride | 13.30 kg |
| Trimethylol propane | 16.80 kg |
| Isononanic acid | 6.18 kg |
| Dimethylol cyclohexane | 0.33 kg |
| Aqueous solution of 85% phosphoric acid | 0.04 kg |

The components were placed in a stainless steel reactor equipped with a stirrer, a packed column, a condenser, oil heating, temperature controls, a vacuum line, and a nitrogen inlet. The reaction mixture was heated under a nitrogen stream. The temperature of the mixture was gradually raised to 240° C. The reaction water was distilled off at such a rate that the temperature at the top of the packed column did not exceed 103° C. Finally, a vacuum of 200 mbar was applied while maintaining the nitrogen stream, and the reaction was run at 240° C. for one hour until an acid value below 5 mg KOH/g was reached. The hydroxyl value of the polyester polyol was 269 mg KOH/g. The polyester polyol had an Mn of 1,114 and an Mw of 2,146, as measured by gel permeation chromatography using polystyrene as standard. The reaction product was finally cooled to 130° C. and diluted with n-butyl acetate to give a polyester polyol solution having a solid content of 77%.

Preparation of a Thiol-Functional Polyester:

Into a glass lined reactor equipped with a stirrer, a distillation setup without column, a condenser, oil heating, temperature controls, vacuum, and a nitrogen inlet were charged 19.76 kg of the polyester polyol 1 solution described above. The butyl acetate was distilled off at 150° C. at 70 mbar.

3.87 kg 3-mercaptopropionic acid were added at atmospheric pressure. The esterification reaction was carried out at 150° C. under vacuum (maintaining the nitrogen flow) until an acid value of approx. 25 mg KOH/g was reached. A second portion of 1.93 kg 3-mercaptopropionic acid was added. Esterification was continued until an acid value of approx. 30 mg KOH/g. 10 g of methane sulfonic acid were added and the esterification was continued until no more reaction water was collected. 4.98 kg n-butyl acetate were added and distilled off at 150° C. at 10 mbar. The reaction mixture was cooled to 130° C. and diluted with 4.98 kg n-butyl acetate. The product was cooled to 50-60° C. and filtered over a 10-micron filter cloth. A thiol-functional polyester was obtained with a solid content of 80.0%, an acid value of 10 mg KOH/g, an SH-value of 146 mg KOH/g, and a hydroxyl value of 61 mg KOH/g, all based on solids. The thiol-functional polyester had an Mn of 1,126 and an Mw of 2,297, as measured by gel permeation chromatography using polystyrene as a standard.

Preparation of a Coating Composition a) Comprising an Isocyanate-Functional Compound and Thiol-Functional Compounds:

A sprayable clear coat composition having a molar ratio of isocyanate-reactive groups to isocyanate groups of 100 to 150 was prepared by mixing the following components:

| | |
|---|---|
| pentaerythritol tetrakis(3-mercapto propionate) | 250 g |
| thiol-functional polyester solution as prepared above | 579 g |
| n-butyl acetate | 616 g |
| Sanduvor 3206 | 24 g |
| Byk 306 | 11 g |
| 10 weight-% solution of dibutyl tin dilaurate in n-butyl acetate/xylene 1:1 | 20 g |
| Tolonate HDT LV | 1,000 g |
| α-Amino acetophenone photolatent base | 10 g |

Preparation of a Comparative Aqueous Coating Composition bα):

A physically drying sprayable water borne white base coat composition was prepared by mixing the following components:

| | |
|---|---|
| AW 098 (toner module) | 900 g |
| Activator WB (reducer module) | 100 g |

Preparation of a Comparative Aqueous Coating Composition bβ):

A physically drying sprayable water borne green base coat composition was prepared by mixing the following components:

| | |
|---|---|
| 577 (toner module) | 900 g |
| Activator WB (reducer module) | 100 g |

Preparation of a Comparative Aqueous Coating Composition bγ):

A physically drying sprayable water borne red base coat composition was prepared by mixing the following components:

| | |
|---|---|
| 504 (toner module) | 900 g |
| Activator WB (reducer module) | 100 g |

Preparation of a Comparative Aqueous Coating Composition bδ):

A physically drying sprayable water borne silver metallic base coat composition was prepared by mixing the following components:

| | |
|---|---|
| 888EC (toner module) | 900 g |
| Activator WB (reducer module) | 100 g |

Preparation of a Comparative Aqueous Coating Composition bε):

A physically drying sprayable water borne gold metallic base coat composition was prepared by mixing the following components:

| | |
|---|---|
| 888YA (toner module) | 900 g |
| Activator WB (reducer module) | 100 g |

Comparative multilayer coating systems A to E were prepared by applying and drying base coat layers from comparative coating compositions bα) to bε) to primed aluminium panels as prescribed in the technical documentation of Autowave. The dry layer thickness of the base coats was about 15 to 40 μm. Subsequently, the sprayable clear coat composition a) as described above was spray-applied on the base coat layers. The applied clear coats had a dry layer thickness of about 50 to 80 μm. The clear coats were allowed to dry at room temperature (20 to 24° C.).

Preparation of an Aqueous Coating Composition b1) According to the Invention:

A physically drying sprayable water borne white base coat composition was prepared by mixing the following components:

| | |
|---|---|
| 098 (toner module) | 900 g |
| Activator WB (reducer module) | 90 g |
| DMEA | 10 g |

Preparation of an Aqueous Coating Composition b2) According to the Invention:

A physically drying sprayable water borne green base coat composition was prepared by mixing the following components:

| | |
|---|---|
| 577 (toner module) | 900 g |
| Activator WB (reducer module) | 90 g |
| DMEA | 10 g |

Preparation of an Aqueous Coating Composition b3) According to the Invention:

A physically drying sprayable water borne red base coat composition was prepared by mixing the following components:

| | |
|---|---|
| 504 (toner module) | 900 g |
| Activator WB (reducer module) | 90 g |
| DMEA | 10 g |

Preparation of an Aqueous Coating Composition b4) According to the Invention:

A physically drying sprayable water borne silver metallic base coat composition was prepared by mixing the following components:

| | |
|---|---|
| 888EC (toner module) | 900 g |
| Activator WB (reducer module) | 90 g |
| DMEA | 10 g |

Preparation of an Aqueous Coating Composition b5) According to the Invention:

A physically drying sprayable water borne gold metallic base coat composition was prepared by mixing the following components:

| | |
|---|---|
| 888YA (toner module) | 900 g |
| Activator WB (reducer module) | 90 g |
| DMEA | 10 g |

Coating compositions b1) to b5) according to the invention contain 1% by weight, calculated on the weight of the total composition, of N,N-dimethyl ethanolamine (DMEA) as basic catalyst. This corresponds to 112 mmol/kg of basic catalyst, calculated on the weight of coating composition b). Multilayer coating systems 1 to 5 according to the invention were prepared by applying and drying base coat layers from coating compositions b1) to b5) to primed aluminium panels as prescribed in the technical documentation of Autowave. The dry layer thickness of the base coats was about 15 to 40 μm.

Subsequently, the sprayable clear coat composition a) as described above was spray-applied on the base coat layers. The applied clear coats had a dry layer thickness of about 50 to 80 μm. The clear coats were allowed to dry at room temperature (20 to 24° C.) in a laboratory with normal illumination, i.e. without UV radiation.

Drying of the clear coats was determined manually. The clear coat was considered dust-dry when gentle rubbing with the thumb hardly left a mark. A tuft of wadding, dropped on the paint, could be blown off. The clear coat was considered dry-to-handle when the mark from firm pushing with the thumb disappeared after 1-2 minutes.

The results are summarized in Table 1:

| Example | Base coat | Clear coat | Drying time of clear coat |
|---|---|---|---|
| A | Coating composition bα) | Coating composition a) | Dust-dry: 85 min. Dry-to-handle: 155 min. |
| 1 | Coating composition b1) | Coating composition a) | Dust dry: 70 min. Dry-to-handle: 140 min. |
| B | Coating composition bβ) | Coating composition a) | Dust dry: 140 min. Dry-to-handle: 170 min. |
| 2 | Coating composition b2) | Coating composition a) | Dust-dry: 85 min. Dry-to-handle: 155 min. |
| C | Coating composition bγ) | Coating composition a) | Dust-dry: 140 min. Dry-to-handle: 180 min. |
| 3 | Coating composition b3) | Coating composition a) | Dust-dry: 120 min. Dry-to-handle: 170 min. |
| D | Coating composition bδ) | Coating composition a) | Dust dry: 90 min. Dry-to-handle: 170 min. |
| 4 | Coating composition b4) | Coating composition a) | Dust dry: 85 min. Dry-to-handle: 155 min. |
| E | Coating composite on bε) | Coating composition a) | Dust-dry: 110 min. Dry-to-handle: 170 min. |
| 5 | Coating composition b5) | Coating composition a) | Dust-dry: 85 min. Dry-to-handle: 155 min. |

From Table 1 it can be inferred that the addition of a basic catalyst to coating composition b) leads to an increased drying speed of a coating composition a) comprising an isocyanate-functional compound and thiol-functional compounds, applied on top of a layer of coating composition b). In the multilayer coating systems 1 to 5 according to the invention the drying times of the clear coats are shorter than the drying times of the clear coats in the corresponding comparative multilayer coating systems A to E. This indicates an increase of the cure speed also when the clear coat is not irradiated with UV radiation. The multilayer coating systems according to the invention also have other desirable properties, such as low strike-in, good hardness, flexibility, scratch resistance, high gloss, and good resistance to organic solvents and water.

The invention claimed is:

1. A multilayer coating system comprising
    at least one layer a) comprising a coating composition a) comprising at least one isocyanate-functional compound and at least one thiol-functional compound, and a photolatent base, and
    at least one layer b) comprising an aqueous coating composition b), wherein the at least one layer a) and the at least one layer b) have at least one common layer boundary, and wherein the coating composition b) comprises at least 17 mmol/kg, calculated on the weight of coating composition b), of a catalyst for the addition reaction of the at least one thiol-functional compound and the at least one isocyanate-functional compound, wherein said catalyst is a tertiary amine.

2. The multilayer coating system according to claim 1, wherein the coating composition a) comprises pentaerythritol tetrakis(3-mercapto propionate).

3. The multilayer coating system according to claim 1, wherein the coating composition a) comprises a thiol-functional polyester.

4. The multilayer coating system according to claim 3, wherein the thiol-functional polyester comprises hydroxyl groups.

5. The multilayer coating system according to claim 1, wherein the coating composition a) comprises pentaerythritol tetrakis(3-mercapto propionate) and a thiol-functional polyester.

6. The multilayer coating system according to claim 1, wherein the photolatent base is an α-amino acetophenone.

7. The multilayer coating system according to claim 1, wherein the at least one layer a) is a clear coat layer.

8. The multilayer coating system according to claim 1, wherein the tertiary amine is N,N-dimethyl ethanolamine.

9. The multilayer coating system according to claim 1, wherein the at least one layer b) is a colour- and/or effect-imparting base coat layer.

10. The multilayer coating system according to claim 1, wherein the coating composition b) comprises a curing agent capable of chemical reaction with functional groups present in coating composition b).

11. A multilayer coating system comprising
    at least one layer a) comprising a coating composition a) comprising at least one isocyanate-functional compound and at least one thiol-functional compound, and a photolatent base, and
    at least one layer b) comprising an aqueous coating composition b), wherein the at least one layer a) and the at least one layer b) have at least one common layer boundary, and wherein the coating composition b) comprises an effective amount of at least one component of a co-catalyst comprising a phosphine component and a Michael acceptor component, and the other of the phosphine component and the Michael acceptor component is present in coating composition a).

12. The multilayer coating system according to claim 11, wherein the at least one layer b) is a colour- and/or effect-imparting base coat layer.

13. The multilayer coating system according to claim 11, wherein the coating composition b) comprises a curing agent capable of chemical reaction with functional groups present in coating composition b).

14. A process of preparing a multilayer coating system comprising the steps of
    i. applying a layer b) of an aqueous coating composition b) comprising at least 17 mmol/kg, calculated on the weight of coating composition b), of a catalyst for the addition reaction of a thiol-functional compound and an isocyanate-functional compound to a substrate, wherein said catalyst is a tertiary amine,
    ii. prior to or subsequent to the application of layer b), applying a layer a) of a coating composition a) comprising at least one isocyanate-functional compound, at least a photolatent base, and at least one thiol-functional compound so that layer a) and layer b) have at least one common layer boundary, and
    iii. curing layer a) at room temperature or an elevated temperature, supported by irradiation with UV and/or visible light.

15. The process according to claim 14, wherein the process is implemented for finishing or refinishing of automobiles, large transportation vehicles, or parts thereof.

16. A method of increasing the drying speed in a multilayer coating system comprising applying a clear coat composition a) comprising at least one isocyanate-functional compound, at least a photolatent base, and at least one thiol-functional compound on top of a base coat layer b) prepared from an aqueous base coat composition b) comprising at least 17 mmol/kg, calculated on the weight of coating composition b), of a catalyst for the addition reaction of the at least one thiol-functional compound and the at least one isocyanate-functional compound, wherein said catalyst is a tertiary amine.

* * * * *